(12) United States Patent
Van Wiemeersch

(10) Patent No.: US 9,505,365 B1
(45) Date of Patent: Nov. 29, 2016

(54) WEARABLE DATA MANAGEMENT DURING AN INCIDENT

(71) Applicant: Ford Global Technologies, LLC, Dearborn, MI (US)

(72) Inventor: John Robert Van Wiemeersch, Novi, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 84 days.

(21) Appl. No.: 14/713,008

(22) Filed: May 15, 2015

(51) Int. Cl.
*G08B 21/00* (2006.01)
*B60R 21/00* (2006.01)

(52) U.S. Cl.
CPC ........ *B60R 21/00* (2013.01); *B60R 2021/0027* (2013.01)

(58) Field of Classification Search
CPC .................................................... B60R 21/00
USPC ........... 340/425.5, 435, 436, 539.11, 539.13, 340/539.16, 573.1
See application file for complete search history.

(56) References Cited

U.S. PATENT DOCUMENTS

| | | | |
|---|---|---|---|
| 6,525,646 B1 | 2/2003 | Bartz | |
| 6,982,656 B1 | 1/2006 | Coppinger et al. | |
| 7,171,026 B2 | 1/2007 | Shinada | |
| 8,036,715 B2 | 10/2011 | Buck | |
| 8,738,292 B1 | 5/2014 | Faaborg et al. | |
| 8,862,486 B2 | 10/2014 | Cordova | |
| 9,037,125 B1 | 5/2015 | Kadous | |
| 9,037,199 B1 | 5/2015 | Stogaitis et al. | |
| 2003/0098784 A1 | 5/2003 | Van Bosch et al. | |
| 2006/0253249 A1 | 11/2006 | Brulle-Drews | |
| 2009/0085728 A1 | 4/2009 | Catten et al. | |
| 2009/0327888 A1 | 12/2009 | Woolf et al. | |
| 2010/0201505 A1 | 8/2010 | Honary | |
| 2010/0280711 A1 | 11/2010 | Chen | |
| 2011/0074565 A1 | 3/2011 | Cuddihy et al. | |
| 2011/0084807 A1 | 4/2011 | Logan et al. | |
| 2012/0053793 A1 | 3/2012 | Sala | |
| 2013/0088352 A1 | 4/2013 | Amis | |
| 2013/0109342 A1 | 5/2013 | Welch | |
| 2013/0150004 A1 | 6/2013 | Rosen | |
| 2013/0158771 A1 | 6/2013 | Kaufmann | |
| 2014/0164559 A1 | 6/2014 | Demeniuk | |
| 2014/0180731 A1 | 6/2014 | Cordova | |

(Continued)

FOREIGN PATENT DOCUMENTS

| | | |
|---|---|---|
| KR | 101319939 B1 | 10/2013 |
| KR | 101335344 B1 | 12/2013 |
| WO | WO 2013188977 A2 | 12/2013 |

OTHER PUBLICATIONS

US 8,868,286, 10/2014, Mullen (withdrawn)

(Continued)

*Primary Examiner* — Jeffery Hofsass
(74) *Attorney, Agent, or Firm* — Frank MacKenzie; Bejin Bieneman PLC

(57) ABSTRACT

A computer is programmed to receive data from one or more vehicle sensors. The computer identifies an incident based on the data. The computer sends a first instruction to a wearable portable device requesting data representing movement of the portable device for a first predetermined time period. The computer receives data from the portable device representing movement of the first portable device for the first predetermined time period.

20 Claims, 4 Drawing Sheets

(56) References Cited

U.S. PATENT DOCUMENTS

| | | |
|---|---|---|
| 2014/0188348 A1 | 7/2014 | Gautama et al. |
| 2014/0297220 A1 | 10/2014 | Raffa |
| 2014/0309934 A1 | 10/2014 | Ricci |
| 2014/0310788 A1 | 10/2014 | Ricci |
| 2014/0333425 A1 | 11/2014 | Giraud |
| 2014/0335902 A1 | 11/2014 | Guba |
| 2015/0019266 A1 | 1/2015 | Stempora |
| 2015/0025917 A1 | 1/2015 | Stempora |
| 2015/0070131 A1 | 3/2015 | Beaurepaire et al. |
| 2015/0130640 A1 | 5/2015 | Ryu et al. |
| 2015/0256996 A1 | 9/2015 | Allen et al. |

OTHER PUBLICATIONS

Non-Final Office Action dated Apr. 7, 2016; U.S. Appl. No. 14/713,019, filed May 15, 2015; 20 pages.

Non-Final Office Action dated Apr. 12, 2016; U.S. Appl. No. 14/713,045, filed May 15, 2015; 13 pages.

Non-Final Office Action dated Apr. 1, 2016; U.S. Appl. No. 14/712,994, filed May 15, 2015; 14 pages.

P. Koteswara Rao, "Scening of an accidental alarm system of vehicles with a Heart beat sensor," International Journal of Emerging Trends & Technology in Computer Science, vol. 2, Issue 2, Mar.-Apr. 2013, pp. 191-194.

Goglia, et al. "Hand-transmitted vibration from the steering wheel to drivers of a small four-wheel drive tractor", Applied Erognomics 34 (2005) 45-49; accepted Sep. 16, 2002 (5 pages).

WEARABLE DATA MANAGEMENT DURING AN INCIDENT

CROSS-REFERENCE TO RELATED APPLICATIONS

This application is related to U.S. patent application Ser. No 14/712,994, entitled "DETERMINING VEHICLE OCCUPANT LOCATION", U.S. patent application Ser. No. 14/713,019, entitled "DETERMINING VEHICLE OCCUPANT LOCATION," U.S. patent application Ser. No. 14/713,025, entitled "HAND-ON STEERING WHEEL DETECTION," and U.S. patent application Ser. No. 14/713,045, entitled "DETERMINING VEHICLE OCCUPANT LOCATION," all being filed on the same day as this application; the complete contents of each of which are hereby incorporated herein by reference in their entireties.

BACKGROUND

Response to an incident such as a vehicle collision may be improved by the timely availability of data. Information such as where an occupant was located in the vehicle at the time of the incident, the acceleration experienced by the occupant during the incident, and the location of the occupant following the incident can be of critical importance during an initial response.

DESCRIPTION

Introduction

Figure 1:
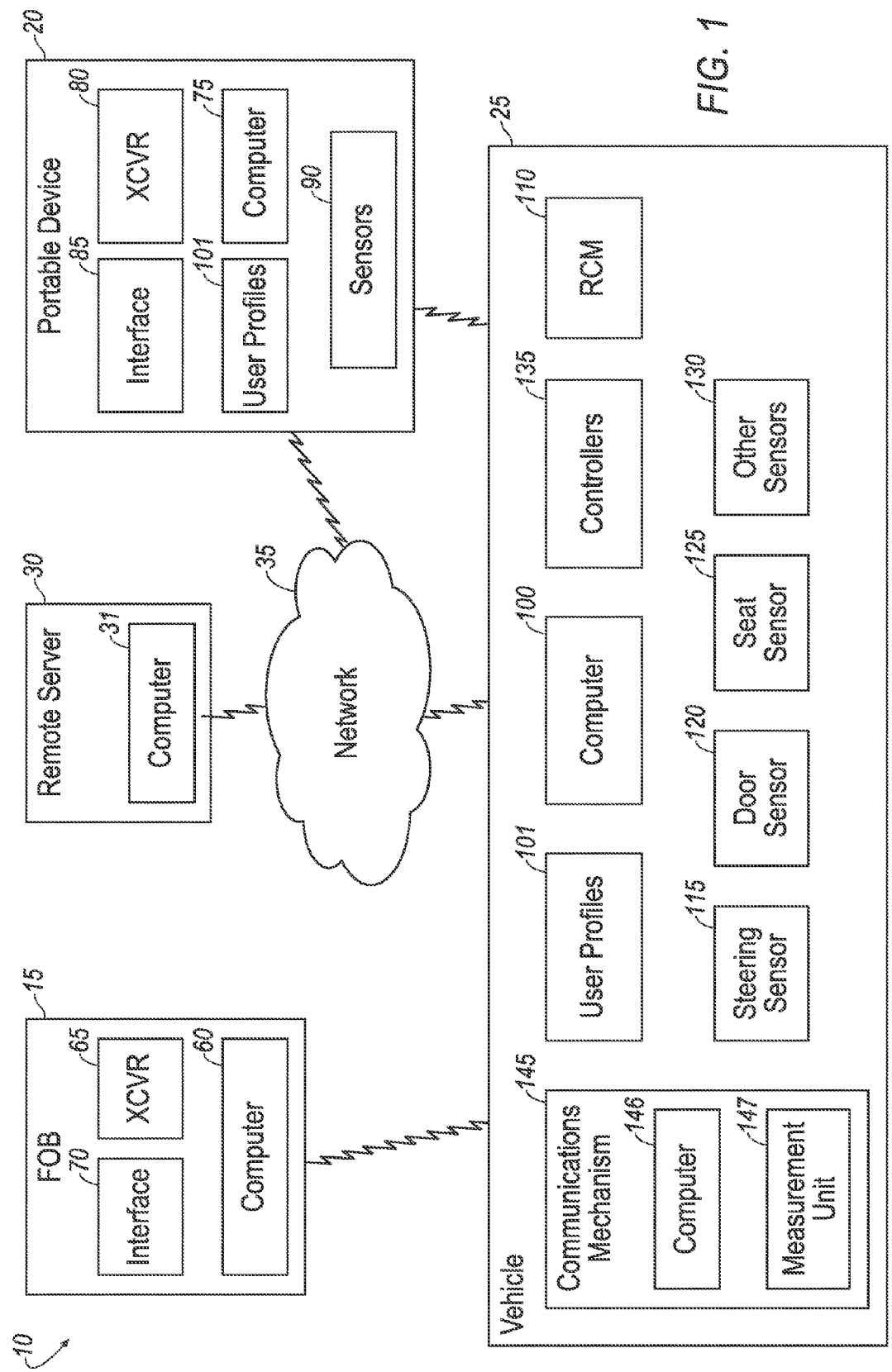
FIG. 1 is diagram of an exemplary system for determining location(s) of one or more occupants of a vehicle using a portable device.

Referring to FIG. 1, portable devices 20, including portable devices 20 that are wearable by a human vehicle occupant, can be used as disclosed herein to provide additional and timelier data to emergency responders following an incident compared to what is presently available. Communications from one or more portable devices 20 may be used by a computer 100 in a vehicle 25 to determine where, within the vehicle 25, a user of the portable device 20 was located in the vehicle 25 prior to the incident. One or more movement sensors 90 in each portable device 20 may additionally provide data indicating acceleration experienced by the user during the incident. Following the incident, the computer 100, based on communications with the portable device 20, may determine a location of the user of the portable device 20. The movement sensors 90 in the portable device 20 may further be used to determine a user state, e.g., whether the user is walking, standing, sitting, etc.

The vehicle computer 100 may, based on data from the vehicle 25 Restraints Control Module 110, or one or more vehicle sensors 115, 120, 125, 130, determine that an incident is in progress or imminent. Based on the determination, the computer 100 may request data from the one or more portable devices 20 such as movement data for a period of time. The computer 100 may receive the data from each portable device 20 and store the data. The computer 100 may, e.g., transmit the data to a remote server 30. If the remote server 30 is not accessible, the computer 100 may transfer the collective set of data from all the portable devices 20 to memory in one or more of the portable devices 20. Further, the computer 100 may download data related to the incident to the portable device 20.

In this manner, data, such as a user location in the vehicle 25 at the time of an incident, acceleration experienced by the user of the portable device 20 during the incident, and user state following the incident, may be made available to responders to the incident. For example, responders may access the data from the remote server 30. Further, responders, such as medical practitioners in a hospital, may be able to access data downloaded to the portable device 20 worn by a user.

System Elements

As shown in FIG. 1, a system 10 includes a remote keyless entry device which may be a traditional fob or, e.g., a phone based remote entry telematics application (hereinafter fob) 15, one or more portable devices 20, a vehicle 25, a server 30 and a network 35. As described below, the fob 15 and portable device 20 may be communicatively coupled with the vehicle 25. Further as described below, the portable device 20 may be, e.g., a wearable device with or without cellular capability, a mobile telephone, a tablet, etc., and may be directly communicatively coupled with the vehicle 25, or indirectly coupled with the vehicle 25, e.g., through another portable device 20. The vehicle 25 may further be communicatively coupled with the server 30 via the network 35.

The fob 15 is configured, i.e., includes known mechanisms such as programming in a computer 60 and hardware such as a transceiver 65 for wireless communications, to send messages to the vehicle 25, e.g., commands or instructions controlling operations of the vehicle 25. For example, the fob 15 may send commands to the vehicle 25 instructing the vehicle 25 to lock or unlock doors, open a trunk lid or other hatch, start the ignition, etc. The fob 15 further generally includes a user interface 70. The fob 15 may be an app on the portable device 20 which sends these same commands to the remote sever 30 or network 35 which may then send commands to the vehicle 25 instructing the vehicle 25 to lock or unlock doors, open a trunk lid or other hatch, start the ignition, etc.

One or more fobs 15 may be paired with a vehicle 25. For example, as is known, a fob 15 may be programmed with a specific identification code and the vehicle 25 may include a list of identification codes authorized to send commands to the vehicle 25. The vehicle 25 may look for one or more identification codes upon receiving messages, and determine if the fob 15 is authorized.

The fob 15 computer 60 includes a processor and a memory. The processor is programmed to execute programs stored in the memory, e.g., to send commands to the vehicle 25. The transceiver 65 is configured to transmit radio frequency (RF) signals to, and optionally receive RF signals from the vehicle 25. As is known, typical fob 15 frequencies of operation for one-way communication are 315 MHz or 433 MH and for two-way communications are 902 MHz or 868 MHz. For Passive Entry and Passive Start systems, the vehicle 25 may send commands to Fob 15 using Low Frequency (LF) transmissions at frequencies of 125 kHz or 135 kHz.

The fob 15 user interface 70 includes one or more input mechanisms and may include a display. The input mechanisms may be buttons, a touch screen display, a gesture sensing device, etc., for receiving input from a user. The display may include an LCD display, LED display, buzzers speakers, haptic feedback, etc., for providing information to the user.

Additionally or alternatively, other systems may also be used to command the vehicle 25 to unlock, start, etc. For example, the vehicle 25 may be equipped with a passive entry system, e.g., that sends a message to fobs 15 proximate to the vehicle 25 and looks for a response from a paired fob 15. Other possible systems to unlock/start/etc. the vehicle 25 include a keypad, remote entry mechanical key, telematics unlock system, etc.

A portable device 20 may be, e.g., a wearable portable device 20 or a mobile portable device 20. A wearable portable device 20 may include a connectivity product such as a "smart" watch, a fitness band, smart clothing, jewelry, etc. A mobile portable device 20 may include, e.g., a mobile telephone, tablet, laptop, etc. Some wearable portable devices 20 may include built-in modems or full cellular capability. Other wearable portable devices 20 may need to link or pair, e.g., with a mobile portable device 20 such as a mobile telephone, tablet, laptop, etc. in order to establish communications with the vehicle 25. Each portable device 20 typically includes a computer 75, a transceiver 80, and an interface 85. The portable device 20 may further include one or more sensors 90, discussed further below.

Each portable device 20 may be associated with a user. For example, the portable device 20 may include a user profile 101, and send the user profile 101 to the vehicle 25 when the portable device 20 initiates communication with the vehicle 25. Alternatively, the portable device 20 may have been paired with the vehicle 25, for example, via a synchronization system in the vehicle 25. In this case, the vehicle 25 may maintain a user profile 101 associated with the paired (synchronized) portable device 20.

The user profile 101 may be a set of data associated with the user. The user profile 101 may include data such as user preferred vehicle settings (e.g., seat settings, minor settings, temperature settings, radio station), user characteristics (e.g., height, weight, age, medical conditions), routines (typically drives to work on weekday mornings), etc. The user profile 101 may be maintained by a computer 100 on the vehicle 25. Additionally or alternatively, one or more portable devices 20 may maintain a user profile 101 identified with the user. The user profiles 101 maintained on the portable devices 20 may be accessed by the vehicle 25 and combined with the data in the vehicle 25 user profile 101. The data in the user profile 101 may be entered by the user via an interface on the vehicle 25 or one of the portable devices 20 associated with the user, determined by the computer 100 in the vehicle 25, downloaded from other computing devices, e.g., the server 30, etc.

The portable device 20 may be configured for short range, wireless communication with the vehicle 25. For example, the portable device 20 transceiver 80 may be a BLUETOOTH® transceiver capable of forming links with other BLUETOOTH transceivers. One or more portable devices 20 and the vehicle 25 may accordingly exchange messages. A portable device 20 may transmit a signal including, e.g., identification data (identifying the type of user device, the identity of a user, etc.), movement data, etc. to the vehicle 25. In addition or alternatively to BLUETOOTH, other suitable wireless communication protocols, e.g., NFC, IEEE 802.11 or other protocols as may be known, may be used for communication between the portable devices 20 and the vehicle 25.

Further, a portable device 20 may be configured to link with other portable devices 20. For example, a first portable device 20 may be a smart watch, and a second portable device 20 may be a mobile telephone. The first portable device 20 may link with the second portable device 20 and exchange data with the second portable device 20; the first and second portable devices 20 may be associated with a same user. As one example, the first portable device 20 may include biometric sensors 90 to measure the heart rate of the user and transmit the heart rate to the second portable device 20. The second portable device 20 may output the heart rate data to the user via the second portable device 20 interface 85. BLUETOOTH communication links typically operate at frequencies from 2402-2480 MHz. As above, other suitable wireless communication protocols such as are known may alternatively or additionally be used to form the communication links with other portable devices 20.

In addition to biometric sensors 90, portable device 20 sensors 90 may include accelerometers, g-sensors, gyroscopes, compasses, light sensors, cameras, etc. The sensors 90 may measure movements of the portable device 20 and output movement data that the portable device 20 may then communicate to the vehicle 25. As described below, the vehicle 25 may determine, based on the movement data, e.g., that the user of the portable device 20 has opened a door of the vehicle 25.

Figure 2:
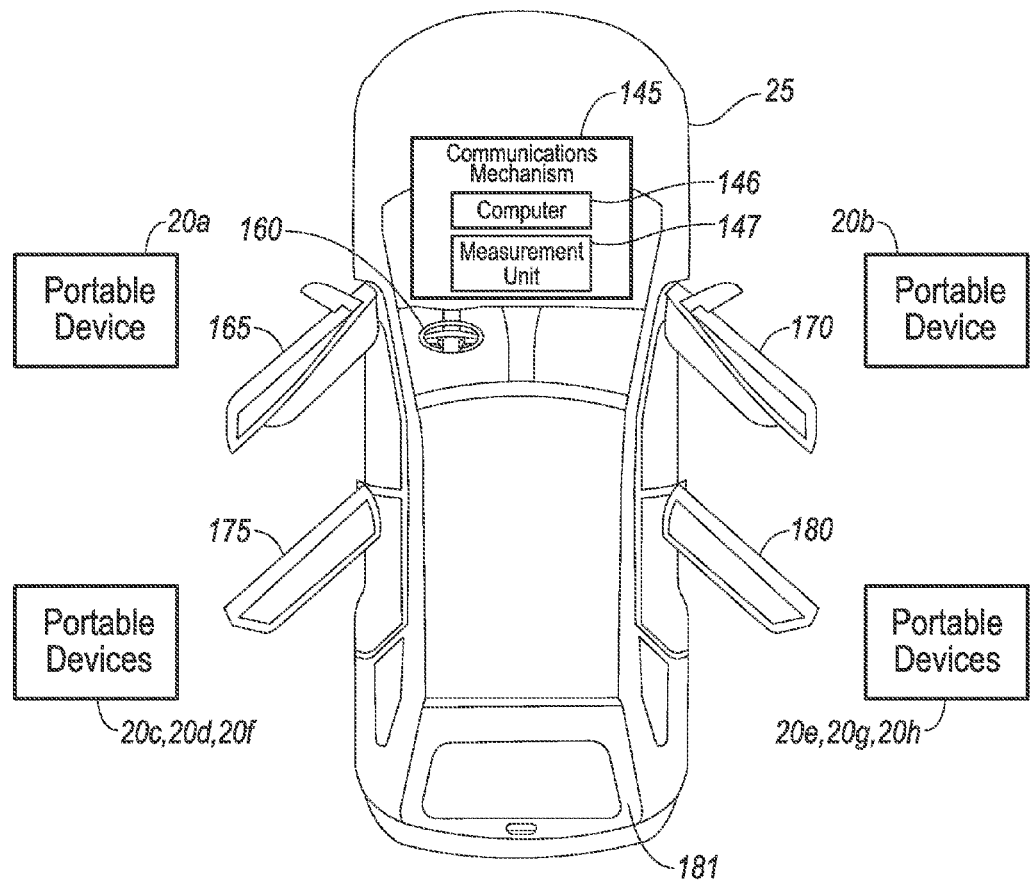
FIG. 2 is a top view of an exemplary vehicle including a communications mechanism for communicating with portable devices.

The vehicle 25 is generally a land-based vehicle having three or more wheels, e.g., a passenger car, light truck, etc. The vehicle 25 accordingly generally has a front, a rear, a left side and a right side, wherein the terms front, rear, left and right are understood from the perspective of a user of the vehicle 25 seated in a driver's seat in a standard operating position, i.e., facing a steering wheel 160 (FIG. 2). The vehicle 25 includes the computer 100 including a processor and a memory. The memory includes one or more forms of computer-readable media, and storing instructions executable by the processor for performing various operations, including as disclosed herein. Further, the computer 100 may include and/or be communicatively coupled to more than one other computer, e.g., Restraints Control Module 110, steering sensors 115, door sensors 120, seat sensors 125, other sensors 130 and controllers 135. The vehicle 125 computer 100 is further typically communicatively coupled with a communications mechanism 145 configured for wireless communications with on-board and external wireless devices including the fob 15, portable device 20, remote server 30 and network 35.

The computer 100 is generally programmed and arranged for communications on a controller area network (CAN) bus or the like. The computing device 100 may also have a connection to an onboard diagnostics connector (OBD-II), e.g., according to the J1962 standard. Via the CAN bus, OBD-II connector port, and/or other wired or wireless mechanisms, the computer 100 may transmit messages to various devices in a vehicle and/or receive messages from the various devices, e.g., controllers, actuators, sensors, etc. In addition, the computer 100 may be configured for communicating, e.g., with one or more remote servers 30, with one or more fobs 15, with one or more portable devices 20, with the Restraints Control Module 110, and/or with the network 35.

The steering sensors 115 may be steering angle sensors, steering torque sensors, motor sensors associated with power steering assist, etc., known to provide data related directly or indirectly to steering operations. For example, a steering sensor 115 may be a steering angle sensor which senses a rotation of a vehicle 25 steering wheel 160, and communicates the steering wheel 160 rotation data to the computing device 100. As another example, a steering sensor 115 may sense rotation of a motor providing power assist for steering operations, and provide the motor rotation data to the computer 100.

Door sensors 120 may be mechanical switches that are activated by the door, proximity sensors, hall-effect sensors, or the like, such as are known, that indicate if a door is open or closed and that provide door status data to the computing device 100. For example, there may be one door sensor 120 associated with each door of the vehicle 25.

Seat sensors 125 may include a variety of sensors including occupancy sensors and seat position sensors such as are known. The seat sensors 125 may, e.g., determine whether a user is occupying a seat, determine the weight of the user, and communicate the determined weight to the computer 100. Further, the seat sensors 125 may detect either directly or indirectly the position of a seat, angle of a seat back, height of a headrest, etc., and provide data to the computer 100 with regard to one or more of these settings. Yet further, the computer 100, may, e.g., upon identifying a seat user, adjust settings to a user profile associated with the user.

The vehicle 25 may include one or more other sensors 130. The other sensors 130, may include, as non-limiting example only, cameras, optical sensors, radar, microphones, proximity sensors, ultrasonic sensors, pressure sensors, accelerometers, g-sensors, gyroscopes, temperatures sensors, current sensors, voltage sensors, infrared sensors, capacitive sensors, etc. The sensors may include processors and memories, and may be configured to communicate with and send data to the computer 100, e.g., via a CAN bus or the like.

The vehicle 25 may also include one or more controllers 135 for controlling vehicle 25 components. The one or more controllers 135 may include known controllers, as non-limiting examples, a seat controller, a power steering controller, a door lock controller, a door latch controller, a climate controller, a mirror adjustment controller, a seatbelt controller, a climate controller, a brake controller, etc. Each of the controllers 135 may include respective processors and memories, one or more actuators, and one or more sensors, as is known. The controllers 135 may be configured to receive instructions from the computing device 100 and control an actuator based on such instructions. For example, a door lock controller 135 may receive an instruction to unlock a door and may cause an actuator to unlock a lock associated with the door. Further, the controller 135 may include sensors. The sensors, may, e.g., detect the action of the actuator. For example, the door lock controller 135 may detect the lock being in an unlocked condition. The controller 135 may provide data regarding the status of the lock to the computer 100.

Specifically, the vehicle 25 may include a restraints control module (RCM) 110. The RCM 110 may include, e.g., g-sensors, and may further receive input from other sensors 130 such as g-sensors, gyroscopes, pressure sensors, etc., in the doors or other areas within the vehicle 25. The RCM 110, may, based on the input received the RCM 110 sensors and other sensors 130, etc., identify or anticipate an incident. The RCM 110 may broadcast this information to the computer 100, other vehicle components including vehicle controllers 135, one or more remote servers 30, etc. The information may be broadcast via a CAN network, or via a dedicated communications link.

As stated above, a vehicle 25 may further include a communications mechanism 145 for wireless communications with vehicle on-board and external devices configured for wireless communications. For example, the communications mechanism 145 may include a computer 146 having a processor and a memory, and a measurement unit 147. The communications may be direct communications, i.e., between a transceiver in the communications mechanism 145 and a transceiver in the wireless device, or indirect communications, e.g., via a network such as a network 35.

The communications block 145 may generally be configured to support communications with 1-Way (typically 315 MHz or 433 MHz), or 2-Way (typically 902 MHz or 868 MHz) remote keyless entry (RKE) systems, passive-entry passive-start (PEPS) systems (125 kHz LF challenge and 315 MHz or 433 MHz response), near field communications (NFC) (typically 13.56 MHz), Bluetooth systems (2402-2408 MHz), vehicle-to-vehicle (V2V) systems and vehicle-to-infrastructure (V2I) systems in the Dedicated Short Range Communications (DSRC) Band (5.9 GHz), portable devices in the cellular bands, Wi-Fi (typically 2.4 GHz or 5 GHz bands), GPS systems (1575.42 MHz and 1227.6 MHz), etc. Examples of protocols that the communication block 145 may support include Bluetooth, NFC, DSRC, 3G UMTS protocols as defined by the 3GPP standards body, 4G LTE protocols as defined by the 3GPP standards body, Wi-Fi 802.11 protocols as defined by IEEE, W-Max 802.16 protocols as defined by IEEE, or other suitable wireless communication protocols.

As described in more detail below, the communications mechanism 145 may be configured to communicate with the fob 15, the portable device 20 and, via the network 35, with a remote server 30.

The communications mechanism 145 may be configured to establish communications with one or more portable devices 20. Upon receiving an instruction to unlock the vehicle 25 as described above, the computer 100 may instruct the communications mechanism 145 to search for and establish communications with portable devices 20 proximate to, e.g., within 3 meters of, the vehicle 25. The communications mechanism 145 may search for all portable devices 20 proximate to the vehicle, or, e.g., a specific list of portable devices 20 associated with known users of the vehicle 25. The portable devices 20 may then respond to the communications mechanism 145. In another scenario, the communications mechanism 145 may, e.g., periodically search for, and establish communications with, portable devices 20 proximate the vehicle 25. Upon establishing communications with the devices 20, the communications block 145 may send instructions requesting user identification data, movement data, etc. from the portable devices 20. In certain scenarios, the computer 100 may specifically establish communications directly or indirectly with wearable portable devices 20.

In addition to communicating with the one or more portable devices 20, the communications mechanism 145 may determine a strength of signals received from respective portable devices 20. As shown in FIG. 1, the communications mechanism 145 may include a measurement unit 147. The measurement unit 147 may receive signals from the portable devices 20, and measure signal strength in a known manner. When applicable, e.g., when seeking to determine a location of a user, the measurement unit 147 should measure the signal strength of the signal transmitted from the wearable portable device 20 and not the signal transmitted from the supporting mobile portable device 20. The measurement unit 147 may provide this information to the computer 100.

As described below, the strength of a signal received from a portable device 20 may be an indication of the distance (also referred to herein as range) of the portable device 20 from the communications mechanism 145. This information may be used, particularly in the case of a wearable portable device 20, to determine a boundary or zone where a user of the wearable portable device 20, is located within the vehicle 25. The measurement unit 147 may determine these zones with one transceiver antenna. Alternatively, two or more antennas may be used if, e.g., they exist for other features.

The vehicle 25 communications mechanism 145 may further be configured to communicate, e.g., over a network 35 with a remote server 30. For example, when the vehicle 25 has been involved in an incident, the vehicle 25 may be able to transmit a message to the remote server 30 indicating that the vehicle 25 was involved in an incident, and may be able to send additional information such as the location of the vehicle 25. When the vehicle 25 is linked to one or more portable devices 20, the vehicle 25, via the communications mechanism 145 may additionally or alternatively be able to send user status information, such as the user's vital signs, to the remote server 30.

The network 35 represents one or more mechanisms by which the vehicle 25 may communicate with remote computing devices, and may be one or more of various wired or wireless communication mechanisms, including any desired combination of wired (e.g., cable and fiber) and/or wireless (e.g., cellular, wireless, satellite, microwave and radio frequency) communication mechanisms and any desired network topology (or topologies when multiple communication mechanisms are utilized). Exemplary communication networks include wireless communication networks, local area networks (LAN) and/or wide area networks (WAN), including the Internet, providing data communication services.

Processes

Identifying a Vehicle Unlock or other Trigger Event for a User Location Identification Process The vehicle 25 computer 100 may receive a signal from the fob 15 to unlock the vehicle 25, or recognize another trigger event for starting a user location identification process. For example, a user of the vehicle 25 may activate the fob 15, and the fob 15 may send an unlock command to the vehicle 25. The vehicle 25 computer 100 may receive the unlock signal, and initiate a process to identify locations of one or more users in the vehicle 25.

As another example, a sensor 130 may detect a user grabbing or touching a door handle to pull on the door handle with the intent to open the door, and based on the detection, the computer 100 may initiate and establish communications with fobs 15 proximate the vehicle 25 to authorize unlocking a door. The computer 100 may determine that one or more of the fobs 15 is an authorized fob 15 for the vehicle 25, e.g., in a manner as described above. Conversely, if the door was already unlocked the trigger of sensor 130 may still be used to inform computer 100 that a user is about to open a door. The computer 100 may also receive an input from a key pad on the vehicle 25, a door or global unlock event activated by a mechanical key, an ignition activated by a mechanical key, from a telematics system, etc. that is identified as a trigger event for initiating a user location identification process. Still further, the computer 100 could initiate the user location identification process periodically, based on a timer, etc.

Identifying Door Opening Events from Wearable Device Movements

Upon recognizing a trigger event, the computer 100 may initiate a process to instruct the portable device 20, which may be a wearable portable device 20, to record g-sensor data for a specified period to identify hand motions and then monitor all vehicle 25 door sensors 120 to determine where users entered the vehicle 25. The computer 100 may monitor g-sensor movements of the portable devices 20 associated with vehicle 25 users, and based on the movement data identify a device 20, and hence a user, that may be associated with opening a particular vehicle 25 door. In the case of only one door opening and only one portable device 20 being identified with a signature movement data pattern, it may be possible to conclude who has entered that door. In cases where more doors have opened than there are detected portable devices 20, additional data is required to predict the user's location. The computer 100 may further use the movement data as an indication of where the user is located in the vehicle 25 after entering the vehicle 25.

Now referring to FIG. 2, the vehicle 25 may include a steering wheel 160, front left door 165, front right door 170, rear left door 175, rear right door 180, and rear hatch door 181. The vehicle 25 may further include the communications mechanism 145. The communications mechanism 145 may be located in a front center portion of the vehicle 25. Alternatively, for example, a portion of the communication mechanism 145 used to establish communication with the portable devices 20 may be located in the center front portion of the vehicle 25, and other portions of the communications mechanism 145 may be located in one or more other locations in the vehicle 25. The portion of the communications mechanism 145 used to establish communications with the portable devices 20 should be strategically placed such that the strength of a signal received from a respective portable device 20 is indicative of a definable zone within the vehicle 25.

As described above, the communications mechanism 145 may include a measurement unit 147, and may be configured to establish communications with portable devices 20. The measurement unit 147 may be configured to measure the strength of signals received from the portable devices 20, and to report the strength of the signals from the respective portable devices 20 to the computer 100 of the vehicle 25.

Upon identifying a trigger event for initiating a user location identification process as described above, the computer 100, based on the trigger event may activate the communications mechanism 145, and instruct the communications mechanism 145 to search for and establish communications with portable devices 20 proximate the vehicle 25. The computer 100 may limit the search to previously paired portable devices 20. As above, when applicable, e.g., when seeking to identify a range of a user from the communications mechanism 145, the measurement unit 147 should measure the signal strength of the signal transmitted from the wearable portable device 20 and not the signal transmitted from the supporting mobile portable device 20.

As shown in FIG. 2, in one example, the computer 100 may find and establish communications (via the communications mechanism 145) with portable devices 20a-20h which are determined to be wearable portable devices 20. The computer 100 may command each of the wearable portable devices 20a-20h to send movement data associated with the respective wearable portable devices 20a-20h to the computer 100.

By monitoring and evaluating the movement data received from the wearable portable devices 20a-20h, the computer 100 may determine, e.g., that the user of wearable portable device 20a has opened a left side door 165, 175. Particular wrist movements, e.g., one or more of twisting counter-clockwise to grab a door handle, swinging up and to the left to open a door handle, swinging to the left on an arc similar to the arc of a door handle on a left handed door being opened, may be indicative of opening a left side door 165, 175 of the vehicle 25.

In a similar manner, the computing device 100 may determine, e.g., that a user of wearable portable device 20*d* also opened a left side door 165, 175, and further, in a similar manner, by identifying gestures associated with a right side door, that e.g., the user of wearable portable device 20*e* has opened a right side door 170, 180.

In addition to identifying movements of a wearable portable device 20 worn by a user on an arm used for opening a door, other types of movements may be identified as movements indicating a door opening. For example, for a user opening a right door 170, 180 with their right arm, and wearing a wearable portable device 20 on their left arm, particular movements, for example the swinging of the left arm around the body during door opening (or entering the vehicle 25) may be indicative of a right door 170, 180 opening event. Other movements of wearable devices 20 may be determined to be characteristic of opening a vehicle 25 door, 165, 170, 175, 180,181. Further, movements that are characteristic of closing a vehicle 25 door 165, 170, 175, 180 may indicate a user having entered a left door or a right door.

As described above, a determination that a user has opened a particular vehicle 25 door 165, 170, 175, 180, 181 may be performed by the computer 100. Additionally or alternatively, the determination may be made, e.g., by the computer 75 in the respective wearable portable device 20, and the results communicated to the computer 100. Additionally or alternatively, the determination may be made by another computer communicatively coupled to the computer 100.

Identifying Location Zones for Wearable Devices based on Received Signal Strength Additional information regarding the location of users within a vehicle 25 may be determined based on a received signal strength of signals received by the communications mechanism 145 from portable devices 20. When applicable, e.g., when seeking to determine a range of a user from the communications mechanism 145, the portable devices 20 may be wearable portable devices 20.

Figure 3:
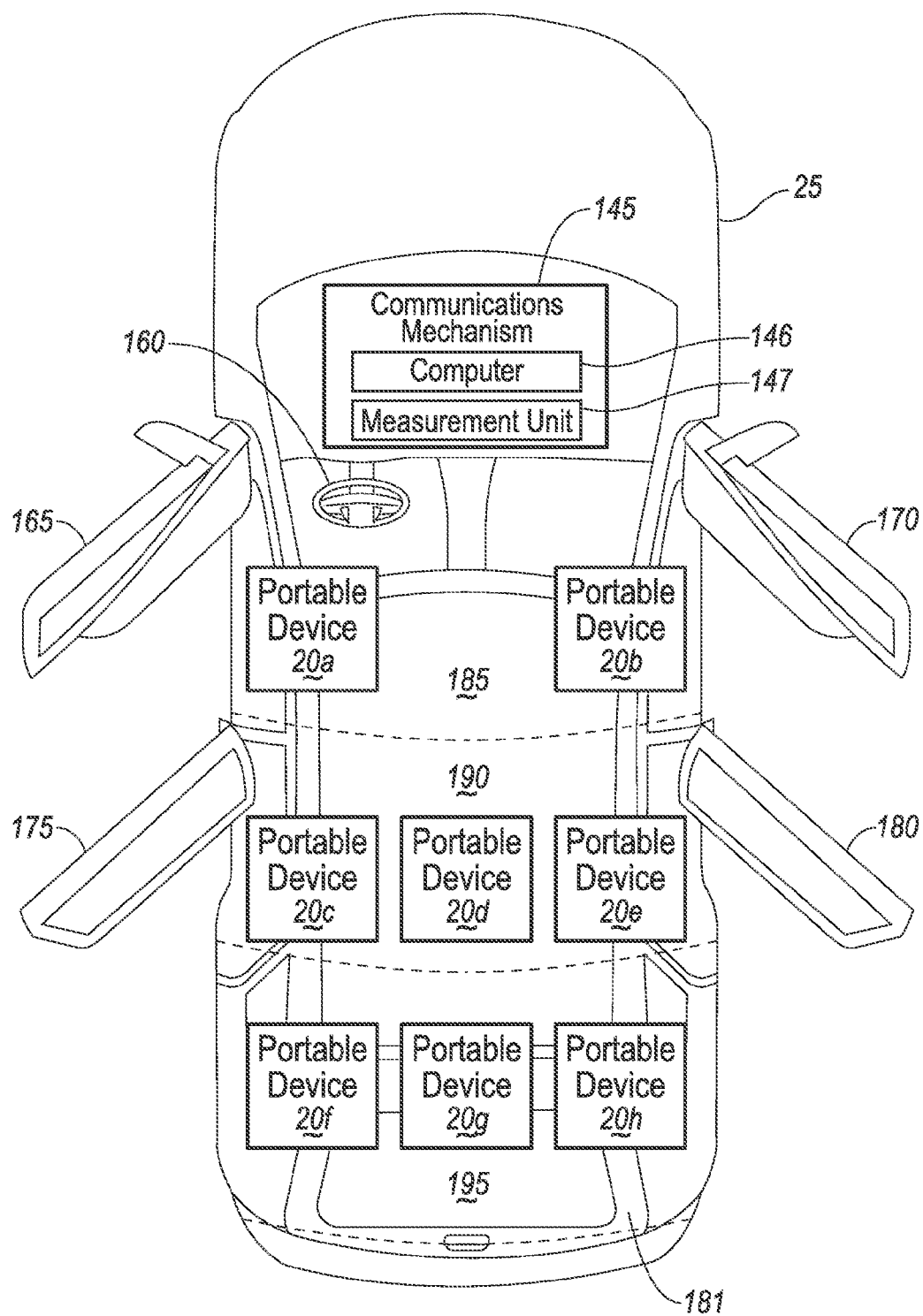
FIG. 3 is a further top view of the exemplary vehicle of FIG. 2, including the communications mechanism, illustrating location zones.

As shown in FIG. 3, the vehicle 25 may be divided into three or more zones based on distance from the communications mechanism 145; a first zone 185, a second zone 190 and a third zone 195. The zones 185, 190, 195 may, e.g., be radially shaped around a receiver portion, e.g., an antenna, in the communications mechanism 145. As another example, the receiver portion in the communications mechanism 145 may be directional, i.e., have a reception sensitivity that is greater in some directions than others, and the zones 185, 190, 195 may be defined by the directionality of the receiver portion.

Further, the zones 185, 190, 195 may extend beyond the vehicle 25 and/or the communications mechanism 145 may receive signals from outside of the defined zones, 185, 190, 195. For example, the communications mechanism 145 may be able to receive a signal from the portable device 20 that is beyond the third zone 195. Further, the zones 185, 190, 195 may form a set of concentric circles around the receive portion, and include areas outside of the vehicle 25. The communications mechanism 145 may determine, based on the RSSI of the portable device 20, that a portable device 20 is within range to communicate with the communications mechanism 145, but outside of the third zone 195.

The portable devices 20*a* and 20*b* may be located in the first zone 185. The portable devices 20*c*, 20*d*, 20*e* may be located in the second zone 190, and the portable devices 20*f*, 20*g*, 20*h* may be located in the third zone 195. As above, each of the portable devices 20*a*-20*h* may be a wearable portable device 20. Also as above, the computing device 100 may establish communications via the communications mechanism 145 with each of the portable devices 20*a*-20*h*.

The communications mechanism 145 may be configured to measure received signal strength of the signals received from each of the portable devices 20*a*-20*h*, and provide a received signal strength indication (RSSI) such as is known to the computer 100 respectively for each of the portable devices 20*a*-20*h*.

Based on the respective received signal strengths, the computer 100 may determine the zone in which each of the portable devices 20*a*-20*h* is located. For example, if the RSSI is greater than or equal to a first predetermined threshold and less than a second predetermined threshold, the computing device may determine that the associated portable device 20 is located within the third zone 195. If the RSSI is greater than or equal to the second predetermined threshold and less than a third predetermined threshold, the computer 100 may determine that associated portable device 20 is located in the second zone 190. If the RSSI is greater than or equal to the third predetermined threshold, the computer 100 may determine that the associated portable device 20 is located in the first zone 185. The first, second and third predetermined thresholds may be determined empirically based on representative portable devices 20, the location of the communications mechanism 145, the type of vehicle 25, etc. In the example according to FIG. 3, the computer 100 would determine that portable device 20*a*-20*b* are in the first zone 185, devices 20*c*-20*e* are in the second zone 190 and devices 20*f*-20*h* are in the third zone 195.

Identifying the Driver and Front Seat Passenger based on Door Opening and Zone Data Based on the door opening data and zone data collected above, the computer 100 can be programmed to determine the driver and front passenger of the vehicle 25.

For example, if, as described above, the computer 100 determines based on the RSSI of the portable device 20*a* that the portable device 20 is in the first zone 185, and determines based on the movement data from the portable device 20*a* that the user of portable device 20*a* entered a left side door of the vehicle 25, the computer 100 may further determine that the user of the portable device 20*a* is located in a front left (driver's) seat of the vehicle 25.

Further, if, in the example above, the computer 100 determines based on the RSSI of portable device 20*b* that the portable device 20*b* is also in the first zone 185, the computer 100 may determine that the user of the portable device 20*b* is in a front passenger seat. The same process for locating the driver and front row passenger can also be applied to right hand drive vehicles by reversing the relationships of detected door opening events.

Management of Mobile Data and Vehicle Data Following Determination that an Incident is In Progress or Imminent Upon determination that an incident is in progress or imminent, the vehicle may instruct portable devices 20 to start recording, then data generated by the sensors 90 of portable devices 20 (mobile data) may be collected by the vehicle 25 computer 100 and distributed, e.g., to the remote server 30. An incident may include, e.g., a collision with an object or another vehicle, running off of the road, a severe braking event sufficient to trigger a fuel cut-off event, a rollover event etc. An incident may be determined to be imminent if, e.g., the vehicle 25 computer 100, determines, based on a current vehicle status, i.e., speed, range from other objects, road condition, location on a road, etc., that an incident is unavoidable, or will occur within a predetermined time, e.g., three seconds or if computer 100 is advised by the restraints control module 110 of the same imminent condition.

The mobile data may include, e.g., movement data representing movement of the portable device 20, location data of the one or more portable devices 20, biometric data of a user wearing the one or more portable devices 20, identification data associated with the one or more portable devices 20, etc. The mobile data may be collected and stored, together with an identifier for a user and/or device 20 associating the portable device 20 or user with the mobile data. The mobile data, together with other data collected by the vehicle 25, may additionally be transmitted to a remote server 30 for further processing. For example, the mobile data and vehicle data may be transmitted to a remote server 30 associated with a hospital or emergency response center, which may use the mobile data and vehicle data to determine the nature of an incident and the injuries that may have been incurred by the vehicle 25 users and other incident victims.

Mobile data may include identification of the portable device 20, identification of the type of portable device 20, e.g., smart watch, fitness band, mobile telephone, etc., movement data, biometric data of the user, timing data, location data, e.g., location based on GPS data, a user profile 101, vehicle make and model, vehicle VIN, license plate of vehicle in which they rode, name of person associated with the portable device 20 if available, etc. Further, the timing data from the portable device 20 may be in the form of a date and time stamped or encoded with some other form of time reference to allow synchronous comparison of data from the multiple portable devices 20.

Vehicle data may include, as non-limiting examples only, vehicle state data such vehicle speed, vehicle acceleration, vehicle location, e.g., based on GPS data, etc. Vehicle data may further include data from the sensors 115, 120, 125, 130 and/or controllers 110, 135 indicating steering angle, seat position, seat occupancy, door status, brake status, airbag deployment status, engine status, seatbelt status, etc. Still further, vehicle data may include user related data such as the number and location of vehicle users, user profiles 101, etc.

The vehicle 25 computer 100 may be programmed to determine, e.g., as is known, that an incident is in progress or imminent and send commands to vehicle components including the communications mechanism 145. The computer 100 may further be programmed to determine an incident reference time identifying a time the incident occurred or will occur. For example, the vehicle 25 may receive data from one or more vehicle steering sensors 115, door sensor 120, seat sensor 125, other sensors 130 and/or the controllers 135. The vehicle 25 other sensors 130 may include accelerometers, gyroscopes, pressure sensors, cameras, radar, ultrasonic sensors etc. which may provide data to the vehicle computer 100. Based on data, the vehicle 25 may, e.g., as is known, determine that an incident is in progress or is imminent. The computer 100 may send messages to the vehicle controllers 135, e.g., one or more airbag controllers 110, 135 to deploy airbags, one or more seatbelt controllers 135 to increase tension to seatbelts, etc.

The computer 100 may further be programmed to send, via the communications mechanism 145, one or more messages to one or more portable devices 20, e.g., portable devices 20 identified as being located in the vehicle 25 at the reference time mentioned above. The message may indicate the incident reference time, and instruct the one or more portable devices 20 to send data from portable device 20 sensors 90 to the vehicle 25 computer 100. Specifically, the computer 100 may communicate with portable devices 20 identified as wearable devices, and request movement data, such as data collected from 3-axis accelerometers 90 included in the wearable portable devices 20, during a predetermined time period.

The predetermined time period may be defined, e.g., as starting one second before the reference time and extending for two seconds after the reference time, or for some other time period.

In addition to requesting movement data, the computer 100 may be programmed to request data such as the location data of the portable device 20 at the reference time. The computer 100 may further request biometric data, such as vital signs of the user of the portable device 20. In some cases, the computer 100 may associate data stored in the vehicle 25, for example, the current location of the user of the portable device 20, with the data received from the portable device 20.

Upon receiving the requested data from the one or more portable devices 20, the computer 100 may generate data, e.g., unique or substantially unique identifiers, associating, for example, movement data, location data, etc. with a particular portable device 20 and/or particular user. The identifiers may be included in a set of data referred to herein as a tag that may also include time stamps indicating when the data was generated relative to the reference time. The computer 100 may store the mobile data, including tags, in a memory associated with the computer 100.

Following the incident, the computer 100 may request movement data, identification data, biometric data, location data (to the extent available), etc. from the portable device 20 for one or more additional predetermined time periods. For example, the one or more additional predetermined time periods could include three-second windows that occur every 10 seconds, for one minute following the reference time.

Further, in a manner as described above, the computer 100 could determine, based on a received signal strength, e.g., a location of the user of the portable device 20 following the incident, and could determine, for example, if the user has (or may have) been thrown from the vehicle 25. For example, if, prior to the incident, the computer 100 determined that the user of the portable device 20 was in zone 185, and after the incident, the computer 100 determined that the user is in zone 195, the computer 100 may further determine that the user was thrown from the vehicle 25.

The computer 100 may further make the mobile data, along with data collected from the one or more vehicle sensors 115, 120, 125, 130 and/or one or more vehicle controllers 110, 135, etc. available to other computers, for example the remote server 30. The mobile data and vehicle data may, in this manner, be made available, for example, to emergency responders to the incident, or to product developers to improve safety features of newly developed vehicles.

For example, location data and movement data at the reference time may provide information related to the type, severity, etc. of an incident. Location data and movement data at a time after the reference time may provide information related to a condition of a user. For example, location data showing a portable device 20 outside the vehicle 25 may indicate that the user was thrown from the vehicle 25 during the incident. Movement data showing that the portable device 20 is moving at a time following the reference time may indicate that the user is walking, etc.

The computer 100 may further initiate downloads of data to one or more portable devices 20. For example, as described above, the vehicle 25 computer 100 may collect vehicle data from the vehicle sensors 115, 120, 125, 130 and vehicle controllers 110, 135 related to an incident. The computer 100 may further collect mobile data from one or more portable devices 20 related to the incident. This data may include video or still frames from vehicle mounted cameras. The computer 100 may then download a portion or all of the data to a particular portable device 20. The downloaded data may be stored by the portable device 20, such that the data is available, for example, to a medical practitioner treating the user following the incident.

For example, following the incident, the computer 100 may identify data, such as vehicle acceleration data at the reference time, movement data from portable devices 20 at the reference time, portions of the vehicle 25 damaged during the collision, etc., that is indicative of the condition of a user of a particular portable device 20. For example, vehicle acceleration data could indicate that the vehicle 25 was hit from the rear. Additional vehicle data could indicate that a rear portion of the vehicle was crushed, and that airbags were deployed for a first user driving the vehicle 25 and a second user in a front passenger seat. Movement data from the portable devices 20 worn respectively by the first and second users could indicate that acceleration was along a front-rear axis of the vehicle 25 and that both the first and second user were still in the vehicle 25 following the incident. The computer 100 may identify data that may be relevant to the condition of each of the first and second users such as acceleration data, airbag deployment data, etc., and download the data identified as relevant to the portable device 20 of the user.

Process for Managing Portable Device and Vehicle Data during an Incident

Figure 4:
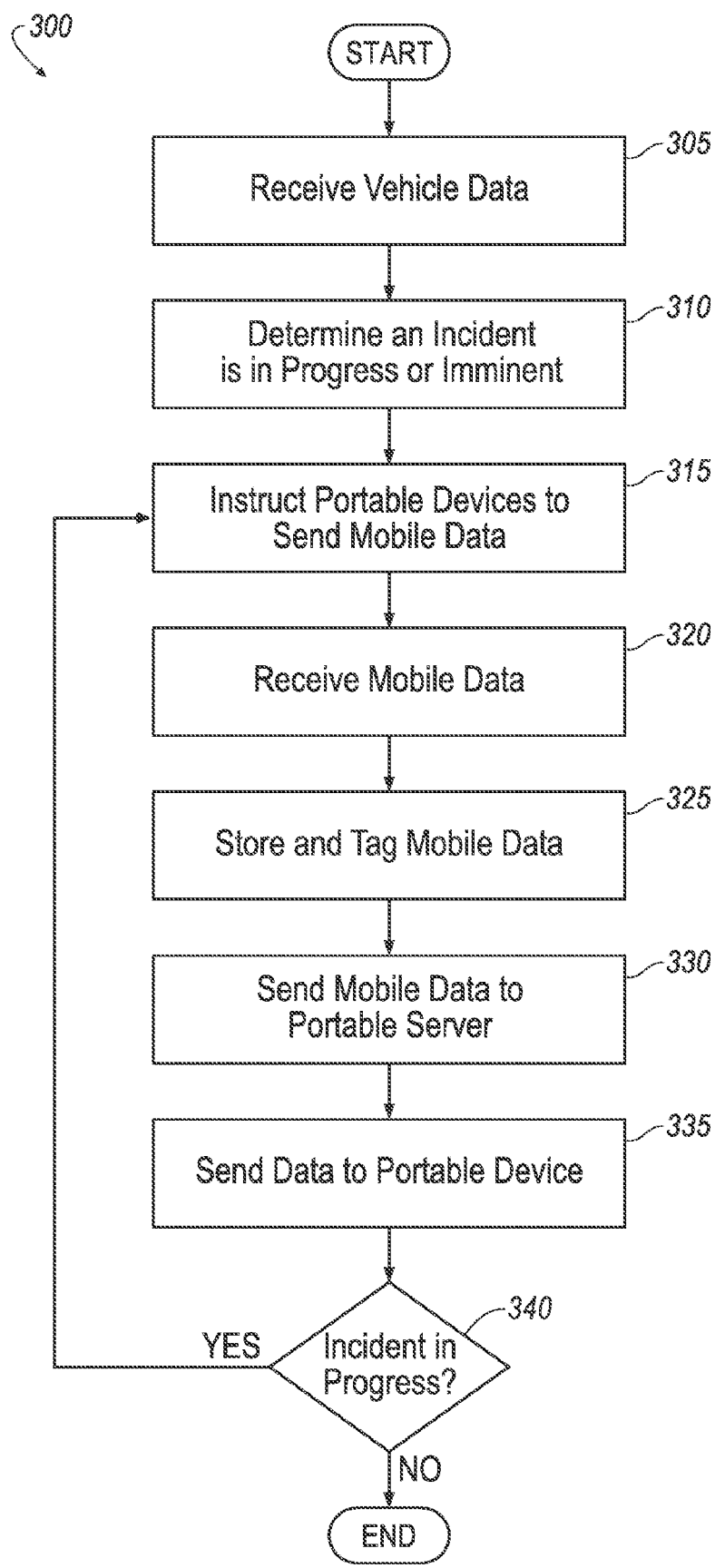
FIG. 4 is a diagram of an exemplary process for managing wearable device data during and after an incident.

FIG. 4 is a diagram of an exemplary process 300 for managing data collected by one or more portable devices 20 and the vehicle 25 when it is determined by the vehicle 25 that an incident is in progress or imminent. The process 300 starts in a block 305.

In the block 305, the vehicle 25 computer 100 receives vehicle data from one or more vehicle sensors 115, 120, 125, 130 and/or from one or more controllers 110, 135. As described above, the sensors 115, 120, 125, 130 may include sensors such as accelerometers, gyroscopes, pressure sensors, cameras, radar systems, ultrasonic sensors, etc. The controllers 110, 135 may include controllers such as seatbelt controllers, airbag controllers, etc. The process 300 continues in the block 310.

In the block 310, the computer 100 determines, e.g., in a known manner, based on the received data, that an incident is in progress or is imminent. The computer 100 may further determine additional information regarding the incident, such as the type and severity of the incident and may generate instructions to vehicle controllers 135 to respond to the incident. The computer 100 may establish a reference time which may be used as a reference for responding to the incident and tagging data related to the incident. The process 300 continues in the block 315.

In the block 315, the computer 100 instructs one or more portable devices 20 to send mobile data associated with the respective portable device 20. For example, the computer 100 may send an instruction to the portable device 20 indicating that the incident is in progress or imminent and include the reference time related to the incident. The computer 100 may instruct the portable device 20 to send location data, movement data, identification data, etc. associated with the portable device 20 during a predetermined time period related to the reference time. Based on the instruction, the portable device 20 may collect data including data from the sensors 90, and send a message to the computer 100 including the mobile data. The process 300 continues in a block 320.

In the block 320, the computer 100 may receive mobile data from one or more portable devices 20. As described above, the computer 100 may further receive a received signal strength indication (RSSI) from the communications mechanism 145. Based on the RSSI, as described above, the computer 100 may determine a zone 185, 190, 195 where the portable device 20 is located. The process 300 continues in a block 325.

In the block 325, the computer 100 may store and tag the mobile data. For example, the computer 100 may receive location and movement data from the portable device 20. The computer 100 may generate one or more tags for the location and movement data. The tags may indicate, e.g., a time when the location or movement data was generated, a portable device 20 which generated the location or movement data, a user associated with the portable device 20 that provided the data, etc. The computer 100 may then store the data, together with the generated tags, in a memory, e.g., a memory associated with the computer 100. The process 300 continues in a block 330.

In the block 330, the computer 100 may send data related to the incident to a remote computer, e.g., the remote server 30. The data may include vehicle data, such as the data received in block 305 related to the incident, and mobile data such as the data received in block 320. The data may further include tags generated by the computer 100 as discussed in block 325. The process 300 continues in a block 335.

In the block 335, the computer 100 may further download vehicle data and/or mobile data to one or more portable devices 20. For example, the computer 100 may identify data, e.g., data showing vehicle 25 acceleration during the incident, data such as data from pressure sensors 30 indicating damage to a particular section of the vehicle 25, etc., which may be helpful to a healthcare practitioner treating the user of the portable device 20. The computer 100 may transmit the data to the portable device 20 including instructions to store the data. The data may include mobile data from other portable devices 20, or mobile data from the portable device 20 receiving the data, with the data organized and tagged in order to be accessible to the healthcare practitioner. The process 300 continues in a block 340.

In the block 340, the computer 100 may determine if the incident is still in progress. For example, the incident may be considered to be still in progress if an initial collision was detected, and the vehicle 25 is still in motion. Additionally or alternatively, the incident may be considered to be still in progress if an incident has not yet occurred but continues to appear imminent. As another example, the incident may be considered to be still in progress for a predetermined time period following the incident, for example, 1 minute. The process 300 may return to the block 315 to collect additional mobile data from the one or more portable devices 20. The additional mobile data may indicate, e.g., that a user of a portable device 20 is still in the vehicle 25, has been ejected from the vehicle 25, is moving, is static, etc. If the computer 100 determines that the event is no longer in progress, the process 300 may end.

CONCLUSION

Computing devices such as those discussed herein generally each include instructions executable by one or more computing devices such as those identified above, and for carrying out blocks or steps of processes described above.

For example, process blocks discussed above may be embodied as computer-executable instructions.

Computer-executable instructions may be compiled or interpreted from computer programs created using a variety of programming languages and/or technologies, including, without limitation, and either alone or in combination, Java™, C, C++, Visual Basic, Java Script, Perl, HTML, etc. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media. A file in a computing device is generally a collection of data stored on a computer readable medium, such as a storage medium, a random access memory, etc.

A computer-readable medium includes any medium that participates in providing data (e.g., instructions), which may be read by a computer. Such a medium may take many forms, including, but not limited to, non-volatile media, volatile media, etc. Non-volatile media include, for example, optical or magnetic disks and other persistent memory. Volatile media include dynamic random access memory (DRAM), which typically constitutes a main memory. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

All terms used in the claims are intended to be given their plain and ordinary meanings as understood by those skilled in the art unless an explicit indication to the contrary in made herein. In particular, use of the singular articles such as "a," "the," "said," etc. should be read to recite one or more of the indicated elements unless a claim recites an explicit limitation to the contrary.

The term "exemplary" is used herein in the sense of signifying an example, e.g., a reference to an "exemplary widget" should be read as simply referring to an example of a widget.

In the drawings, the same reference numbers indicate the same elements. Further, some or all of these elements could be changed. With regard to the media, processes, systems, methods, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claimed invention.

The invention claimed is:

1. A computer, comprising a memory device and a processor storing instructions executable by the processor such that the computer is programmed to:
   receive data from one or more vehicle sensors;
   identify, based at least in part on the data, an incident;
   send a first instruction to a wearable portable device requesting a first set of data representing movement of the portable device for a first predetermined time period; and
   receive the first set of data.

2. The computer of claim 1, further programmed to:
   determine, prior to identifying the incident, a first location of a user in the vehicle.

3. The computer of claim 2, wherein the portable device is associated with the user.

4. The computer of claim 2, further programmed to:
   associate the first set of movement data with the user.

5. The computer of claim 4, wherein the vehicle includes a user profile associated with the user, and the computer is further programmed to:
   associate the first set of movement data with the user is based at least in part on the user profile.

6. The computer of claim 5, further programmed to:
   generate a first tag associated with the first set of movement data, the tag including the identification of the user; and
   store the tag with the movement data.

7. The computer of claim 6, further programmed to:
   receive vehicle data from one or more vehicle sensors during the predetermined time period; and
   store at least a portion of the vehicle data with the first set of movement data.

8. The computer of claim 7, further programmed to:
   transmit at least a portion of at least one of the vehicle data, the first set of movement data and the associated first tag to a remote server.

9. The computer of claim 7, further programmed to:
   transmit at least a portion of at least one of the vehicle data, the first set of movement data and the associated first tag to the portable device.

10. The computer of claim 2, further programmed to:
    send a second instruction to the wearable portable device requesting a second set of data representing movement for a second predetermined time period, the second predetermined time period being after the incident;
    receive the second set of data representing movement of the portable device for the second predetermined time period from the portable device.

11. The computer of claim 10, further programmed to:
    measure a signal strength of the portable device following the incident; and
    determine, based on the strength of the portable device, a second location of the user.

12. The computer of claim 11, further programmed to:
    compare the first location to the second location; and
    determine, based on the comparison, whether the user remained in the vehicle following the incident.

13. The computer of claim 1, further programmed to:
    identify an incident reference time, the incident reference time indicating one of a time the incident occurred or a time at which the incident is predicted to occur; and
    send the incident reference time to the portable device.

14. The computer of claim 13, wherein the first predetermined time period begins prior to the incident reference time and ends following the incident reference time.

15. A method, comprising:
    determining a first location of a user in a vehicle;
    receiving data from one or more vehicle sensors;
    identifying, based at least in part on the data, an incident;
    sending a first instruction to a wearable portable device associated with the user requesting a first set of data representing movement of the portable device for a first predetermined time period; and
    receiving the first set of data.

16. The method of claim 15, further comprising:

identifying an incident reference time, the incident reference time indicating a time the incident occurred or may occur; and sending the incident reference time to the portable device.

17. The method of claim 15, further comprising:

associating the first set of movement data with the user.

18. The method of claim 17, further comprising:

generating a first tag associated with the first set of movement data, the tag including the identification of the user;

receiving vehicle data from one or more vehicle sensors during the first predetermined time period; and storing the vehicle data, the first set of movement data and the first tag.

19. The method of claim 18, further comprising:

transmitting at least a portion of at least one of the vehicle data, the first set of movement data and associated first tag to a remote server, and transmitting at least a portion of at least one of the vehicle data, the first set of movement data and associated first tag to the portable device.

20. The method of claim 15, further comprising:

sending a second instruction to the wearable portable device requesting a second set of data representing movement for a second predetermined time period, the second predetermined time period being after the first predetermined time period;

receiving the second set of data representing movement of the portable device for the second predetermined time period from the portable device;

measuring a signal strength of the portable device following the incident; and determining, based on the strength of the portable device, a second location of the user.

* * * * *